April 24, 1962
J. W. HORNER
3,030,940
HOT GAS SERVO SYSTEM
Filed March 6, 1959
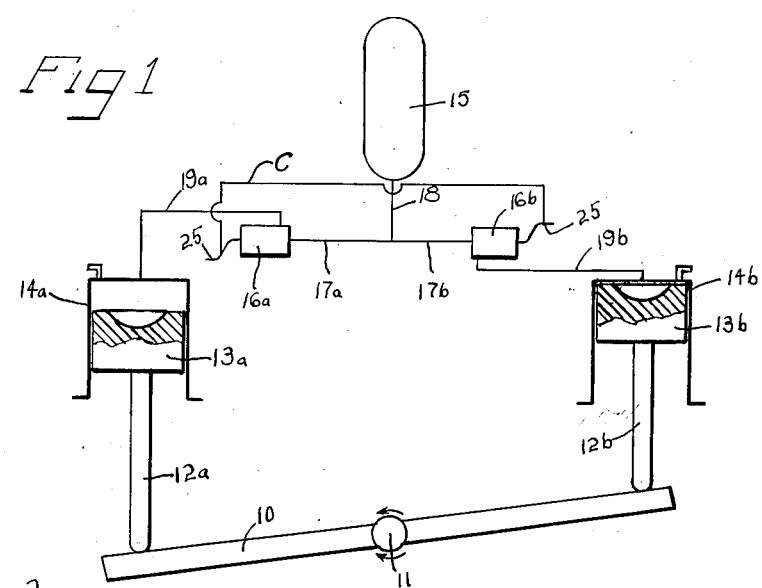
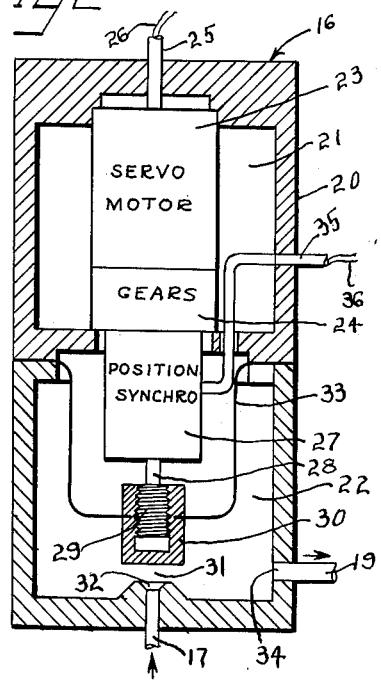
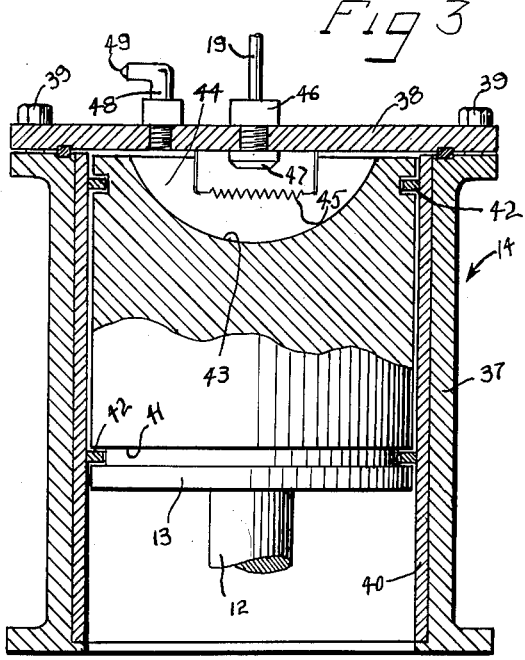
Inventor
JOHN W. HORNER United States Patent Office 3,030,940
Patented Apr. 24, 1962

3,030,940
HOT GAS SERVO SYSTEM
John W. Horner, Whittier, Calif., assignor to Thompson Ramo Wooldridge, Inc., Cleveland, Ohio, a corporation of Ohio
Filed Mar. 6, 1959, Ser. No. 797,720
3 Claims. (Cl. 123—1)

The present invention relates broadly to servo systems, and is more particularly concerned with a new and improved servo system wherein relatively cool fuel is controllably directed or metered to actuator means and the working fluid generated therein.

It is the customary practice in the art, and particularly in aircraft and missile applications, to employ hydraulic systems to activate components exemplified by aero-dynamic surfaces, vector nozzles, gimbaled rockets, arming devices, dump devices and the like. While to date the hydraulic system has generally performed quite effectively, it suffers from the disadvantages of being relatively unsuited to high environmental temperatures generated by the high speeds of advanced aircraft, and the requirement for precision components therein which has resulted in relatively high production and maintenance cost.

It has accordingly been proposed to employ hot gas servos in substitution therefor, and one such system of which applicant is aware meters hot gas to actuator means by action of a hot gas valve in the discharge lines from the actuator means, the valve means preferably being under control of a torque motor receiving a signal from a suitable amplifier. The working chambers of the actuator means receive hot gas through a generator from a suitable propellant tank, and the actuators are linked to an aero-dynamic surface or other device to be controlled. By action of the valve means in the hot gas discharge lines from the actuators, a pressure differential is applied between the actuators and control of the surface or other device effected.

While the hot gas metered servo system briefly described in the preceding paragraph represents a remarkable advance over a hydraulic system, and avoids the named disadvantages connected therewith, the hot gas metered servo system at present does present problems by way of hot gas valve design and as now conceived requires hot gas lines of rather substantial weight and size.

It is accordingly a primary aim of the present invention to provide a fuel metered hot gas servo system which permits the utilization of existing valve structures and the positioning thereof in relatively cool liquid lines.

Another object of this invention lies in the provision of a hot gas servo system characterized by lighter system weight, improved transient response and increased total reliability.

Another object of this invention lies in the provision of improvements in a hot gas servo system provided with a pair of actuator means effecting movement of a device to be controlled by applying a pressure differential between said means, the improvements comprising a gas generator communicating with each of the actuator means and a source of liquid fuel, and metering means between each actuator means and the source of liquid fuel and controlling the flow of said fuel to the gas generator in response to an input signal whereby a presure differential is created between the actuator means and movement of the device to be controlled effected in accordance with said pressure differential.

A further object of the present invention is to provide a hot gas servo system, which comprises a pair of actuator means each having a movable member arranged to translate a device to be controlled, means providing a gas generating chamber communicating with the movable members to apply gas pressures thereagainst and effect movement thereof, means containing relatively cool liquid fuel to be supplied to the gas generating chamber, means to ignite the fuel directed to said chamber, and means connecting with the liquid fuel containing means and with the gas generating chamber and responsive to an input signal to control the rate of fuel flow to said chamber and the pressure of the gas generated therein by ignition of the fuel, whereby the device to be controlled is translated in accordance with the differential in pressures applied against said movable members.

Other objects and advantages of the present invention will become more apparent during the course of the following description, particularly when taken in connection with the accompanying drawings.

In the drawings, wherein like numerals are employed to designate like parts throughout the same:

FIGURE 1 is an essentially diagrammatic view of a hot gas servo system constructed in accordance with the principles of this invention;

FIGURE 2 is a sectional view of an exemplary fuel metering valve which may be employed in the system of FIGURE 1; and FIGURE 3 is a sectional view, with parts in elevation, of an illustrative form of actuator means which may be utilized in the system herein disclosed.

Briefly stated, the present invention is directed to a fuel metered hot gas servo system provided with a pair of actuators each operating a piston or other movable member acting upon a device to be controlled exemplified by an aero-dynamic surface to effect movement thereof to various positions. The movable members are caused to travel by fluid generated within a gas geenrator connected with each of the actuators, and liquid fuel is supplied to the gas generators at controlled flow rates from a propellant tank or suitable source by means of a metering valve or equivalent means located in the relatively cool liquid fuel lines between the source and the gas generators.

The metering valve, which may be a single composite unit or a pair of cooperating units, delivers to one or both of the gas generators a controlled fluid flow in response to an input signal. The liquid fuel so delivered is ignited within the gas generators, and the differential in pressures within the two actuators causes travel of the proper piston to change the position of the device to be controlled. Actuator pressures are thus a function of fuel flow rate.

It may accordingly be seen that the valving is in relatively cool liquid lines, and that relatively heavy and large hot gas lines are eliminated. The system further has improved transient response and improved reliability.

Referring now to the drawings, there is shown in FIGURE 1 a fuel metered hot gas servo system by means of which a device 10 to be controlled may be pivoted in the directions indicated about a point 11 in order change or alter the position of the device 10. The device 10 may be an aero-dynamic or hydro-dynamic surface, a vector nozzle, gimbaled rocket, arming device, dump device or related mechanisms requiring movement to a new position. Control of an aero-dynamic surface is a typical application for the instant system and the system will be described in connection therewith, although it will be appreciated that many uses exist for the disclosed system, and further, the device 10 may have a motion other than pivotal about a predetermined point.

In the illustrative application shown in FIGURE 1, the device or surface 10 is contacted at opposite ends by piston rods 12a and 12b connecting with pistons 13a and 13b which reciprocate within actuator means 14a and 14b by gas pressures generated therein through the ignition of relatively cool liquid fuel supplied from a tank or other suitable source 15. The structural features of an exemplary form of actuator 14 will be described in detail hereinafter, as will metering valves 16a and 16b which receive liquid fuel through branch conduits 17a and 17b from a main conduit 18 and control the rate of fuel flow through conduits 19a and 19b to the actuator means 14a and 14b, respectively. It will be observed from FIGURE 1 that the actuators 14, pistons 13 reciprocal therein, and valve means 16 controlling fuel flow thereto are identical in construction, and accordingly in the description now to follow the features of one only of said elements will be discussed specifically.

It is important to note that the valve means 16 are interposed between the actuator means 14 and tank or container 15 in lines 17 and 19 which carry relatively cool liquid fuel. The valve means 16 may accordingly be of generally conventional construction and an exemplary structural arrangement of metering valve is shown in FIGURE 2, to which reference is now made. The valve 16 is provided with a housing 20, which may be in two sections or portions as shown, to form first and second compartments 21 and 22. The first compartment 21 houses a servo motor 23 and connecting gear box 24, and the servo motor receives a conduit 25 containing therein electrical connections 26 leading to the control panel of the aircraft or other vehicle and transmitting a signal therefrom to drive the servo motor 23.

The second compartment 22 of the valve housing 20 contains therein a position synchro 27 connecting with the gear box 24 mounting a shaft 28 which turns a lead screw 29 to move a piston 30 and control the gap 31 between said piston and an inlet orifice 32 connecting with the branch conduit 17 and the tank 15. The second compartment 22 further houses seal means 33, which may be of the diaphragm type and clamped between the two abutting portions of the valve housing 20 to protect the position synchro 27, gear box 24 and servo motor 23 against fuel which enters through the orifice 32.

The second compartment 22 communicates through an outlet 34 with the conduit 19 leading to the actuators 14, while the first compartment 21 receives through one wall thereof a conduit 35 carrying electrical leads 36 therein leading to the position synchro 27 and connecting at their opposite ends with the master control panel of the aircraft to feed thereto position information as to the piston 30.

It will now be appreciated that an input signal transmitted through the electrical connections 26 drives the servo motor 23 and through the gear box 24 the shaft 28 is rotated to move the piston 30 axially and vary the gap 31 between the head of said piston and the orifice 32 feeding fuel to the second compartment 22 through the branch conduit 17. Accordingly, the fuel flow into the second compartment 22 and through the outlet 34 to the actuators 14 is directly proportional to the position of the servo motor 23 and the input signal fed thereto. It will further be appreciated that the metering valves 16a and 16b may be packaged together or employed individually in accordance with space or other requirements, and that one each of said valves is required for each actuator 14a and 14b. Although not specifically shown, the valves 16a and 16b are connected electrically as at C so that one valve delivers to its companion actuator a minimum fuel quantity for idle conditions, and the other delivers fuel in proportion to the actuator pressure differential requirement.

The connection C may be seen to be made between the conduits 25 and which lead to the control panel of the aircraft or other vehicle, so that an input signal to the servo motors 23 of each valve means 16a and 16b is effective to move the piston 30 in one valve 16a or 16b a distance less than the amount which would completely close the orifice 32 in one of said valves.

The particular liquid fuel controllably flowed by the valve means 16 from the tank or container 15 to the actuators 14 may similarly be varied for particular applications. It is required, however, that the fuel be of the liquid rather than the solid grain type, and in investigations conducted to date particularly good results have been obtained when using hydrazine. While the specific liquid fuel employed forms no part of the present invention, it may be noted that additives in the form of ammonium nitrate or unsymmetrical dimethyl hydrazine may be used to vary the temperature of the gaseous products resulting from decomposition of the fuel.

Referring now to FIGURE 3, there is illustrated an exemplary embodiment of actuator 14 particularly suited for use in the hot gas servo system of FIGURE 1, featuring a gas generator as an integral part thereof to effect movement of the piston 13 and a change in the relative position of the device or surface 10. Although a separate gas generator is required for each actuator 14a and 14b in order that the actuator pressures may be controlled by the flow of liquid fuel to the actuator gas generator, the gas generator serving each actuator may be located remotely therefrom. This would, however, require a high pressure hot gas tube to effect the connection, and in most applications such a tube would be an undesirable element from a structural and operational standpoint.

The exemplary form of actuator 14 shown in FIGURE 3 comprises a hollow housing or body portion 37 closed at one end thereof by a plate member 38 through the use of bolt means or the like 39. The housing 37 is provided interiorly with an annular liner 40 of high temperature and wear-resistant properties which may be in press fit relation with the actuator housing for receiving the piston 13 in slidable contact therealong.

The piston 13 is provided at axially spaced locations along its outer diameter with grooves 41 receiving piston rings 42 in rubbing relation with the liner 40, and the head portion of the piston 13 is formed with a concave recess 43 therein to provide with the plate member 38 a gas generating chamber 44. The gas generating chamber 44 may be seen from FIGURE 3 to be substantially semi-hemispherical in shape, and mounted by the cover plate 38 in dependent relation within said chamber is an igniter 45. Electrical ignition means are illustrated in the drawings, however, it will be appreciated that in substitution therefor a squib or hypergolic slug may be used.

Relatively cool liquid fuel is admitted to the gas generating chamber 44 in impinging contact with the igniter 45 by means of an injector 46 carried by the plate member 38 and provided with a nozzle portion 47 for directing a relatively fine mist of hydrazine fuel against the heated ignition means 45. The injector 46 receives liquid fuel through the conduit 19 connecting the metering valve 16. When electrical ignition means 45 is employed as shown, a heatup time of a few seconds is required, whereas if a squib or hypergolic slug is used, such means are turned on at the same time the fuel is injected into the chamber 44 from the metering valve 16. Relatively cool liquid fuel, in the form of hydrazine or other suitable liquid compounds, upon impinging against the igniter 45 essentially instantaneously decomposes and liberates heat energy while creating large volumes of gaseous products. Such products act largely against the concave recess 43 in the piston head 13 and the pressures therefrom drive the piston 13 axially away from the plate member 38 pivoting or otherwise moving the device or surface 10 to a new position under ignition of the piston rod 12. As is appreciated, once an ignition of the hydrazine takes place in the chamber 44, additional fuel admitted to said chamber is ignited thereby without the use of the igniter means 45.

Communicating with the gas generating chamber 44 and carried by the plate member 38 on each actuator 14 is an exhaust or discharge nozzle 48 provided with a fixed orifice 49. The exhaust nozzle 48 serves to port exhaust gases to a desired location, which may be overboard the aircraft, missile or other vehicle employing the hot gas servo system of this invention.

It will now be seen that hydrazine or related liquid fuels are supplied to the metering valves 16a and 16b through the main conduit 18 and branch conduits 17a and 17b therefrom. While not specifically shown, a pump may be employed in the conduit 18 to facilitate the liquid fuel flow to the metering valves. To translate or move the device or surface 10 to a new position, as for example the position of FIGURE 1 wherein the surface 10 is pivoted counter-clockwise about the point 11, an input signal is fed to the servo motor 23 of the valve 16a to open the gap 31 between the head of the piston 30 in said valve and the orifice 32 therein communicating with the conduit 17a. Simultaneously, by reason of an electrical connection between the valves 16a and 16b, a minimum quantity of liquid fuel is delivered by the valve 16b through the conduit 19b to the actuator 14b to create an idle condition therein. The maximum quantity of fuel is delivered, however, by the valve 16a from the compartment 22 therein and through the outlet 34 to the conduit 19a leading to the actuator 14a. The input signal from the aircraft or missile console to the servo motor 23 in the valve 16a determines fuel flow in proportion to the actuator pressure differential requirement, and the relatively cool liquid fuel is directed or controlled by the metering valve 16a through the conduit 19a to the gas generating chamber 44 of the actuator 14a. The liquid fuel is ignited therein by the starting means 45, and upon ignition and decomposition of the liquid fuel flowing to the chamber 44 substantial quantities of thermal energy and volumes of gaseous products are released. The gaseous products act upon the head and recessed portion 43 of the piston 13a to force said piston axially away from the cover plate 38 on the actuator housing 37, and the piston rod 12a pivots the surface or device 10 in a counter-clockwise direction about the point 11 to move the surface to the desired new position. Gaseous products are ported from the outlet 48 and preferably overboard, and reverse operation takes place when it is desired to move the surface 10 clockwise about the point 11. It is thus to be seen that fuel flow to the actuators 14a and 14b from the metering valves 16a and 16b is directly proportional to the position of the servo motor 23 in each of the metering valves and is of course also directly proportional to the input signal fed to the servo motors.

More specifically, in accordance with this invention a pair of actuator means 14a and 14b are operatively connected to a device 10 for moving said device in accordance with a pressure differential between said actuator means. In this same arrangement, metering means 16a and 16b are connected at C to provide limited fuel flow to one of the gas actuators 44 for idle conditions and to provide a fuel flow to the other gas actuator 44 in accordance with this pressure differential. To explain, the fuel flow for each actuator varies with the input torque thereto, the fuel flow decreasing from a maximum at the extreme position to idle flow at the mid-point or intermediate position. Idle flow then prevails for any one actuator for as long as it is not providing corrective torque.

As used herein, "idle flow" refers to a minimum tolerable fuel flow rate in order to sustain ignition, and as will now be appreciated, there is clearly no need to have a greater fuel flow if this side of the actuator is not resisting torque. However, it is highly desirable to maintain ignition so that delays associated with starting the reaction do not spoil the response characteristics of the servo. Further, to the "active" actuator, or actuator not receiving the idle fuel flow, a fuel flow is provided which is in proportion to the pressure differential between the active and inactive actuators in order to off-set the shaft torque applied.

It will further be seen from the foregoing disclosure that a feature of the present invention is that the working fluid is generated in the actuator itself, and accordingly, the pressure in each actuator is set by the rate at which fuel is fed to each actuator by the metering valve means or control means substituted therefor. Since the working fluid is generated in the actuator, there is no longer the requirement for valves capable of withstanding the deteriorating influence of hot gases, and conversely, this permits the utilization of existing valve constructions. The system disclosed in FIGURE 1 is characterized by a lighter weight as compared with earlier conceived systems, and the novel assembly of elements of FIGURE 1 provides a better transient response and overall reliability. As compared with hydraulic systems, the system of FIGURE 1 is insensitive to environmental conditions and there is essentially a complete absence of precision parts therein.

It will further be appreciated that various changes and modifications may be made in the hot gas servo system herein disclosed without departing from the novel concepts of the present invention.

I claim as my invention:

1. In a hot gas servo system having a pair of actuator means operatively connected to a device for moving said device in accordance with a pressure differential between said actuator means, a gas generator communicating with each of said actuator means, metering means communicating with each of said gas generators and with a source of fuel receiving said fuel and directing the same to each of said gas generators in response to an input signal, and means connecting said metering means to provide limited fuel flow to one of said gas generators for idle conditions and to provide a fuel flow to the other gas generator in accordance with said pressure differential.

2. In a hot gas servo system having a pair of actuator means operatively connected to a device for moving said device in accordance with a pressure differential between said actuator means, a gas generator communicating with each of said actuator means, valve means, conduit means connecting said valve means with a liquid fuel source and with each of said gas generators for flowing a controlled quantity of relatively cool fuel from said course and through said valve means to each of said gas generators in accordance with an input signal to said valve means, said conduit means providing a unidirectional fluid flow path from said source and through said valve means to said gas generators and said valve means being free of hot gas connection with said gas generators whereby hot gases are not ported to said valve means, and means connecting said valve means to provide limited fuel flow to one of said gas generators for idle conditions and to provide a fuel flow to the other gas generator in accordance with said pressure differential.

3. In a servo system for the actuation of movable surfaces and wherein the surface is operatively connected to a pair of actuator means driven by pressures from gas generating means in accordance with a pressure differential between said actuator means, the improvement which comprises conduit means connecting said gas generating means with a liquid fuel source, cool valve means in said conduit means receiving relatively cool liquid fuel from said source and metering said fuel to said gas generators in response to an input signal to said valve means whereby said actuator means are driven in accordance with said pressure differential, said conduit means between said valve means and said gas generators providing solely a unidirectional cool liquid fuel path and said valve means and said gas generators being otherwise free of fluid communication to prevent the flow of hot gases from said generators to said valve means, and means connecting said valve means to provide limited fuel flow to one of said gas generators for idle conditions and to provide a fuel flow to the other gas generator in accordance with said pressure differential.

References Cited in the file of this patent
UNITED STATES PATENTS

| | | |
|---|---|---|
| 1,969,736 | Erling | Aug. 14, 1934 |
| 2,584,127 | Harcum et al. | Feb. 5, 1952 |
| 2,648,317 | Mikulasek et al. | Aug. 11, 1953 |